Jan. 17, 1961 M. M. KAHN 2,968,321
REINFORCED FLEXIBLE HOSE
Filed April 2, 1958
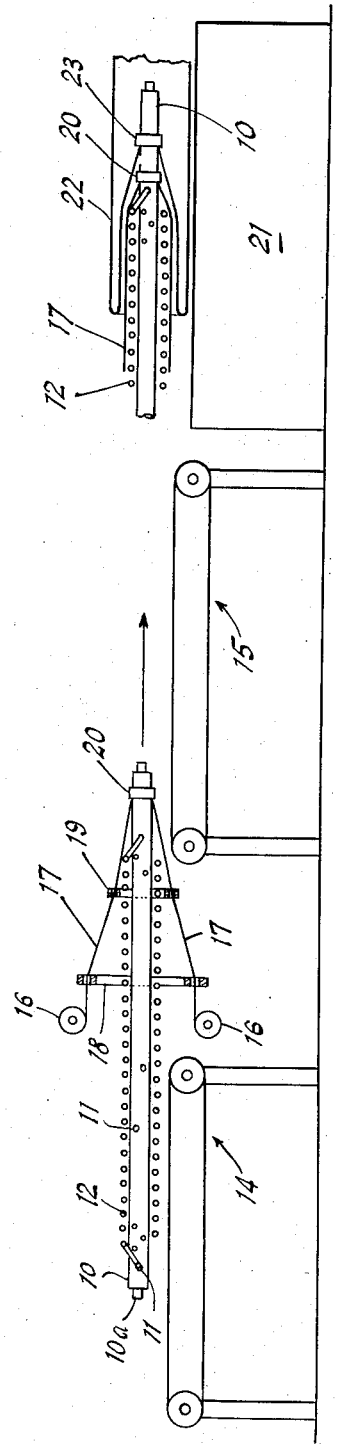
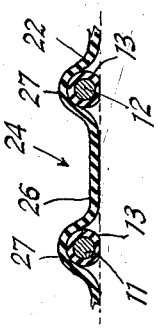
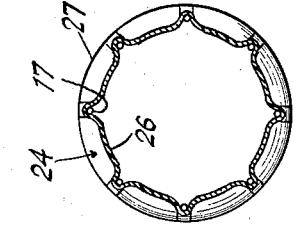
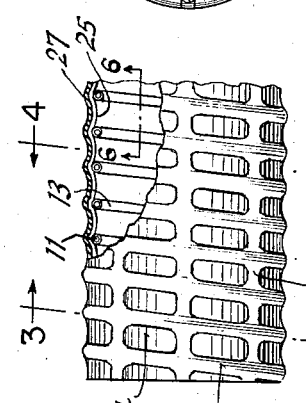
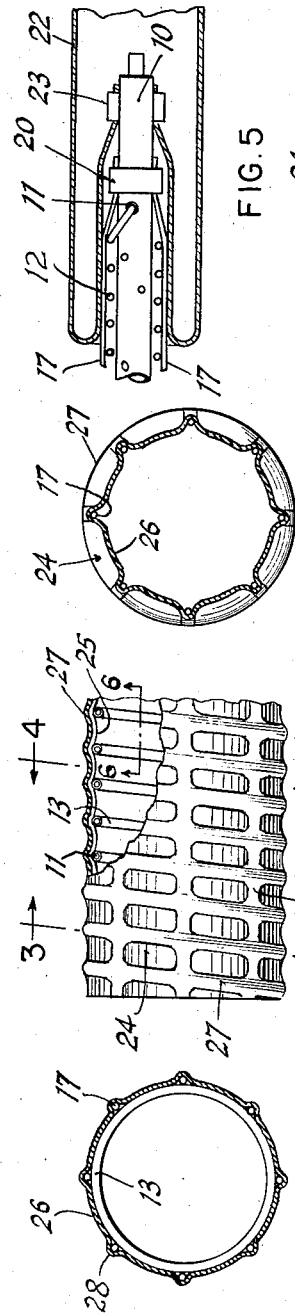
INVENTOR.
Marvin M. Kahn
BY
Philip G. Hilbert
ATTORNEY

United States Patent Office 2,968,321
Patented Jan. 17, 1961

2,968,321

REINFORCED FLEXIBLE HOSE

Marvin M. Kahn, Trenton, N.J., assignor to The Acme-Hamilton Manufacturing Corp., New York, N.Y., a corporation of Delaware Filed Apr. 2, 1958, Ser. No. 725,833

14 Claims. (Cl. 138—56)

This invention relates to reinforced, flexible conduits such as hose and the like. More specifically, the invention concerns the manufacture of flexible hose from tubular members or sheaths of plastic material with reinforcing means in the wall portions thereof, and the resultant article.

Flexible hose made from synthetic plastic materials and a coiled wire reinforcing insert, have found particular use in association with vacuum cleaners. However, such specific usage of this type of hose subjects the same to severe conditions of use. It has been found that the effective life of known plastic hose constructions is somewhat limited, and on a comparative basis, appears to be shorter than that of the rubberized fabric carcass type of hose having a braided cover, which has at least in part, been replaced by the plastic hose.

In actual service conditions, it has been found that the plastic hose has a tendency to break down at either end thereof, adjacent the metal ferrules or fittings by which the hose is connected at one end to the vacuum cleaner and at the other end to the various cleaner tools. Such break down of the hose is accelerated by the severe flexure of the hose at these points. To a lesser extent, plastic vacuum cleaner hose is also subject to failure at intermediate points in the length thereof, due apparently to sharp and repeated flexure at such points when the hose is hung up on a hook or other projection, when not in use.

While attempts have been made to reinforce plastic hose to offset weaknesses inherent in the material from which the same is made, such reinforcements tend to increase the hose weight per unit length, render the same bulky and substantially increase the manufacturing costs.

Furthermore, reinforcing procedures applied to the particularly vulnerable end portions of the hose, usually result in a stiffening of the hose structure at said end portions, which in effect merely displaces the zones of weakness to points at the juncture of the stiff reinforced ends and the more flexible adjacent portions of the hose.

Accordingly, an object of this invention is to provide an improved reinforced flexible plastic hose, wherein the reinforcing structure extends throughout the length thereof so as to uniformly increase the resistance of the hose to break down at all points in the length thereof.

A further object of this invention is to provide in a flexible plastic hose of the character described, improved reinforcing means which adds very little to the weight of the hose per unit length thereof; which does not detract from the flexibility of the hose at any point in the length thereof; which leaves the hose of uniform appearance and without bulkiness; and gives to the hose a unique and pleasing appearance.

Another object of this invention is to provide an improved flexible plastic hose having a novel reinforcing structure which lends itself to efficient assembly and fabricating operations and economical manufacturing costs.

Other objects of this invention will in part be obvious and in part hereinafter pointed out.

In the drawing,

Fig. 1 is a diagrammatic representation of successive steps in the manufacture of hose embodying the invention;

Fig. 2 is a front elevational view of said hose, with portions cut away;

Fig. 3 is a transverse sectional view taken on the line 3—3 of Fig. 2;

Fig. 4 is a transverse sectional view taken on the line 4—4 of Fig. 2;

Fig. 5 is a diagrammatic showing of the application of the tubular sheath to the reinforcement structure, in making the hose; and Fig. 6 is a partial longitudinal section taken on the line 6—6 of Fig. 2.

In accordance with the instant invention, the novel hose is made essentially by providing a helical wire reinforcement which may be mounted on a hollow mandrel with the wire convolutions at a suitable axial spacing; the wire being preferably coated with a plastic material. A plurality of reinforcing strands are arranged generally longitudinally of the wire reinforcement and in contact therewith, the strands being circumferentially spaced from each other. The reinforcing strands may be monofilaments or multifilaments of nylon, polyester, acrylic, cellulose derivative or other suitable fiber forming material.

With the longitudinal reinforcing strands taped or otherwise held in place at the ends of the mandrel; a tubular sheath of plastic material is applied to the mandrel to overly the wire and strand reinforcing structure, the opposite ends of the sheath also being taped to the mandrel.

The assembly of reinforcements and sheath on the mandrel, is placed in an oven; the mandrel at one end being connected to a source of vacuum. Since the surface portions of the mandrel are perforated, the application of vacuum is effective to act on the wall portions of the sheath to pull the same radially into contact with the surface portions of the mandrel between successive wire convolutions and successive reinforcing strands which intersect said wire convolutions.

The heat of the oven will bond the inner surface portions of the plastic sheath to the opposed portions of the wire and strand reinforcements; and further, fix the position of the inwardly displaced sheath portions. The mandrel assembly is then removed from the oven, the hose removed from the mandrel and the ends thereof are trimmed.

The hose of the instant invention may be made as indicated in Fig. 1, wherein 10 is a hollow mandrel having a connector 10a at one end thereof for connection to a source of vacuum, not shown. The mandrel 10 is perforated, as at 11 and a wire helix 12 is arranged along the length of said mandrel with a suitable spacing between the convolutions thereof; the ends of the helix 12 being anchored in perforations at the opposite ends of the mandrel. Preferably, the wire 12 has been precoated with a suitable plastic material 13.

The mandrel and wire assembly, thus prepared, may be moved on a conveyor 14 towards another conveyor 15 longitudinally aligned therewith. Between the conveyors 14, 15, there are arranged a plurality of reels or spools 16 of reinforcing strand material 17; said reels being located radially outward of the assembly in a circular disposition at uniform angular intervals. The strands 17 are guided longitudinally by a perforated guide ring 18 and brought into adjacent relationship to wire helix 12 by a guide ring 19.

The leading ends of strands 17 are secured to leading end portions of mandrel 10, as by taping at 20. As mandrel assemblies are moved over conveyors 14, 15, in end to end relation, the strand material 17 coming from reels 16 is cut at suitable intervals and the trailing ends taped or otherwise secured to the trailing end portion of the mandrel 10. Thus, the strands 17 are held securely in position against the wire helix 12. Any number of reels or spools 16 may be used; and with eight such spools located at 45° intervals, eight strands 17 at equal circumferential spacings will extend transversely of the wire helix 12 and in contact therewith, as indicated in Fig. 3.

At a table 21 longitudinally aligned with conveyor 15, each assembly of mandrel, wire helix and reinforcing strands has applied thereto a tubular sheath or outer covering 22, which may be rolled onto the assembly, as shown in Fig. 1, or otherwise applied by procedures known in the art. The inside diameter of sheath 22 may approximate the outside diameter of mandrel 10; and the sheath may be preliminarily distended to facilitate the placement thereof over the reinforcing structure made up of helix 12 and strands 17.

At this point, the opposite ends of sheath 22, which may extend beyond the ends of the helix 12, are taped down to the mandrel 10, as at 23. The reinforcing strands 17 will lie in taut relation from end to end, as determined by the regulated feed of spools 16 in relation to the longitudinal movement of mandrels 10. Thus, the reinforcing strands 17 will contact the inner surface portions of sheath 22 and the coating 13 on wire helix 12.

The mandrel assemblies may now be removed from table 21 and placed in an oven, not shown, operating at a regulated temperature; provision being made for connecting connectors 10a on each mandrel, with a source of vacuum, not shown, by suitable conduits, not shown, all in a manner known in the art.

As the mandrel assemblies are heated to render the sheath 22 plastic, vacuum is applied and is effective to force wall portions of said sheath 22 radially inward toward the mandrel surface, thereby partially enclosing outer portions of the wire convolutions 12 and the strands 17, as shown in Figs. 4 and 6.

Upon leaving said mandrel assemblies in the oven for a given interval at a temperature proportioned to the fusion characteristics of the material from which sheath 22 is formed, the inwardly displaced wall portions of sheath 22, indicated at 24, will be fixed in their displaced positions and the coating 13 on wire helix 12 will be bonded to opposed surface portions of said sheath.

The reinforcing strands 17 will be slightly displaced radially inward between successive convolutions of wire helix 12, to produce an undulated effect in said strands as indicated at 25 in Fig. 2. The depth of said undulations will be determined by the extensibility of the strand material and the degree of tautness of said strands when the same are associated with wire helix 12.

It will be apparent from a consideration of Fig. 2 that the inwardly displaced wall portions 24 of sheath 22 will be of a substantially rectangular shape, being each defined by adjacent pairs of wire convolutions 12 and adjacent pairs of strands 17 intersecting said wire convolutions.

Each displaced portion 24 will include a valley portion 26 with a bottom surface substantially coplanar with the bottom surface portions of wire coating 13, as indicated in Fig. 6; and peak portions 27 overlying the upper surface portions of coating 13 on each convolution of wire 12, said peak portions 27 extending transversely of the hose. At circumferentially spaced intervals, peak portions 27 will be separated from wire helix 12 by intervening strands 17, which may be flattened and embedded in coating 13 on the convolutions of said helix.

The displaced portions 24 of sheath 22 are further defined by longitudinally extending peak portions 28 overlying strands 17, and intersecting peak portions 27. Thus, the continuous, corrugated effect which would be produced by the radical displacement of wall portions of sheath 22 between adjacent convolutions of the wire helix, is modified by the presence of reinforcing strands 17, which interrupt the transverse corrugations to give a waffle-like effect to the outer surface of the hose.

The reinforcing strands 17, which are derived from suitable synthetic or natural fibers, may be precoated with selected adhesive agents such as polyvinyl butyral or polyester resins, phenolic modified nitrile rubbers, or other resins or rubbers known in the art, to augment the bonding action between said strands and the contacting surface portions of sheath 22 and wire coating 13.

The sheath 22 may be formed from various thermoplastic or heat softenable materials such as polyvinyl chloride, vinyl copolymers, polyethylene, vinyl chloride-vinylidene chloride copolymers, polyacrylonitriles, as well as rubber or synthetic rubber compositions including butadiene-styrene and butadiene-acrylonitrile copolymers and the like. The wall thickness of said sheath may be selected in terms of conditions of usage of the finished hose.

The wire 12 may be of steel, aluminum alloy or the like and may be used with or without coating 13 thereon. With aluminum alloys, the diameter of the wire may be substantially increased without undue increase in total weight, to provide a greater depth for the inwardly displaced sheath material between wire convolutions, thus regulating the flexibility of the finished hose.

It has been found that the reinforcing strands 17, which may be of any suitable denier, in gross, add very little to the total weight of the hose; yet effect a substantial increase to resistance to cracking, despite sharp and repeated flexure of the hose at any point in the length thereof. Furthermore, strands 17 are effective to counteract any tendency toward excessive elongation of the hose while in use. It is understood that strands 17 may extend at angles other than 90° relative to the convolutions of wire helix 12.

The reinforcing strands 17 may be derived from monofilaments or multifilament yarns in twisted or untwisted form, and may also take the form of thin strips cut from thin sheets of synthetic resin, such as the polyester known as Mylar. The adhesive applied to the reinforcing strands should be selected for compatibility with wire coating 13, which may be polyvinyl chloride or other suitable plastic material, as well as with the material of sheath 22. Also, such adhesive should be of a flexible nature and adapted to retain its adhesive and flexure properties despite exposure to the elevated temperatures incident to the fabrication of the hose.

As various changes might be made in the embodiment of the invention herein described without departing from the spirit thereof, it is understood that all matter disclosed herein shall be deemed illustrative and not limiting except as set forth in the appended claims.

Having thus disclosed my invention, I claim as new and desire to protect by Letters Patent:

1. A flexible conduit comprising a helical coiled reinforcing member having axially spaced convolutions, a tubular member of organic plastic material having spaced wall portions thereof engaging the convolutions of said reinforcing member, and a plurality of reinforcing strands in spaced relation to each other disposed between said tubular member and said coiled reinforcing member and extending angularly of the convolutions of said coiled member, said tubular member having other wall portions thereof radially and inwardly depressed between successive convolutions of said coiled reinforcing member and adjacent reinforcing strands, said coiled member and reinforcing strands being exposed on the inner surface of said conduit.

2. A flexible conduit comprising a thin walled tubular member of thermoplastic material, a coiled wire reinforcing member having axially spaced convolutions within said tubular member, and a plurality of reinforcing strands between the inner surface of said tubular member and the convolutions of said wire reinforcing member, said strands extending substantially longitudinally of said conduit and in circumferentially spaced arrangement, said tubular member having a plurality of circumferentially successive and adjacent wall portions thereof radially and inwardly depressed between each pair of adjacent wire convolutions.

3. A flexible conduit comprising a tubular member of thermoplastic material, a reinforcing wire helix within said tubular member with the convolutions thereof in axially spaced relation, a plurality of circumferentially spaced reinforcing strands between said tubular member and said helix, said strands extending substantially transversely of the convolutions of said helix, said tubular member having wall portions thereof inwardly depressed between successive wire convolutions and successive reinforcing strands, and other wall portions partially surrounding outer surface portions of said wire convolutions and reinforcing strands.

4. A flexible hose comprising a tubular thermoplastic member, a helical wire reinforcement having axially spaced convolutions within said tubular member and in engaging relation thereto, and a plurality of reinforcing strands in contact with inner surface portions of said tubular member and outer surface portions of said wire convolutions, said strands being spaced relative to each other and extending at an angle to said wire convolutions, said tubular member having circumferentially and longitudinally spaced wall portions thereof radially and inwardly depressed between successive wire convolutions and successive adjacent strands intersecting said wire convolutions.

5. A flexible hose comprising a thin walled tubular member of flexible organic plastic, a plastic coated helical wire reinforcement having axially spaced convolutions, within said tubular member, a plurality of spaced reinforcing elements between said tubular member and said wire reinforcement, said elements extending substantially transversely of the wire convolutions, said tubular member having a plurality of inwardly and radially depressed portions between successive wire convolutions, said depressed portions being circumferentially separated by successive reinforcing elements.

6. A flexible hose comprising a thin walled tubular member of organic plastic, a helical wire reinforcement having axially spaced convolutions, within said member and in engaging relation to inner surface portions thereof, a plurality of spaced reinforcing strands between said wire reinforcement and said tubular member, said strands extending transversely of the wire convolutions, said tubular member having axially spaced wall portions partially surrounding said wire convolutions and circumferentially spaced wall portions partially surrounding said reinforcing strands and wall portions connecting said first and second mentioned wall portions, said third mentioned wall portions being inwardly depressed and having inner surface portions substantially coplanar with the inner surface portions of said wire convolutions.

7. A flexible hose comprising a thin walled tubular sheath of thermoplastic material, a helical wire reinforcement having axially spaced convolutions, within said sheath, and a plurality of spaced reinforcing strands between said wire reinforcement and said sheath, said strands extending at an angle to the wire convolutions, said sheath having wall portions radially and inwardly displaced between successive wire convolutions and successive strands, the inner surface portions of said displaced wall portions being substantially coplanar with the inner surface portions of said wire convolutions.

8. A hose as in claim 7 wherein said strands are adhesively bonded to opposed portions of said sheath and said wire convolutions.

9. A flexible hose comprising a tubular sheath of organic plastic material, reinforcing means for said sheath on the inner surface thereof, said means comprising spaced, flexible elements extending substantially longitudinally of said hose, and spaced, flexible elements extending substantially transversely of said hose and in intersecting relation to said first mentioned elements, said sheath having a plurality of radially and inwardly depressed wall portions, each of said depressed wall portions being located between a pair of adjacent first mentioned reinforcing elements and a pair of adjacent second mentioned reinforcing elements intersecting said pair of first mentioned reinforcing elements, adjacent depressed wall portions being connected by raised wall portions overlying said pairs of first and second mentioned reinforcing elements.

10. A hose as in claim 9 wherein said first mentioned reinforcing elements are strands of adhesive coated fibers and said second mentioned reinforcing elements are plastic coated wires, the connecting wall portions of said sheath being bonded to said adhesive coated fibers and said plastic coated wires.

11. A flexible hose comprising a tubular, thermoplastic sheath, reinforcing means on the inner surface portions of said sheath comprising longitudinally and transversely extending, spaced reinforcing elements, said sheath having a plurality of spaced, substantially rectangular shaped wall portions displaced inwardly from the cylindrical surface thereof, each of said wall portions being disposed between a pair of adjacent longitudinally extending reinforcing elements and a pair of adjacent transversely extending reinforcing elements intersecting said first mentioned pair of reinforcing elements.

12. A hose as in claim 11 wherein said sheath further includes longitudinally extending, circumferentially spaced wall portions overlying said longitudinally extending reinforcing elements, and transversely extending, axially spaced wall portions overlying said transversely extending reinforcing elements.

13. A hose as in claim 12 wherein said longitudinally extending reinforcing elements comprise synthetic fibers and said transversely extending reinforcing elements comprise a helical, plastic coated wire.

14. A flexible hose comprising a tubular reinforcing structure including a helically wound reinforcing element having axially spaced convolutions and a set of spaced reinforcing strands intersecting and in contact with the convolutions of said reinforcing element and extending at an angle thereto, and a tubular sheath of thermoplastic material over said reinforcing structure, said sheath having longitudinally and circumferentially spaced wall portions substantially continuously contacting the longitudinal extent of said intersecting strands and reinforcing element, the wall portions of said sheath bounded by said longitudinally and circumferentially spaced wall portions being inwardly and radially depressed relative to said spaced wall portions.

References Cited in the file of this patent

UNITED STATES PATENTS

| | | |
|---|---|---|
| Re. 13,568 | Cobb | May 27, 1913 |
| 2,312,587 | Price | Mar. 2, 1943 |
| 2,678,666 | Theis et al. | May 18, 1954 |
| 2,695,631 | Seck | Nov. 30, 1954 |
| 2,713,381 | Seck | July 19, 1955 |
| 2,739,616 | Duff | Mar. 27, 1956 |
| 2,747,616 | De Ganahl | May 29, 1956 |
| 2,782,803 | Rothermel et al. | Feb. 26, 1957 |
| 2,822,857 | Rothermel et al. | Feb. 11, 1958 |
| 2,891,581 | Roberts | June 23, 1959 |